United States Patent

Maruhashi et al.

[11] Patent Number: 5,849,840
[45] Date of Patent: Dec. 15, 1998

[54] DISPERSING STABILIZER

[75] Inventors: Motokazu Maruhashi, Kusatsu; Kizo Ohnishi, Hirakata, both of Japan

[73] Assignee: Nippon Gohsei Kagaku Kogyo Kabushiki Kaisha, Osaka, Japan

[21] Appl. No.: 838,947

[22] Filed: Apr. 23, 1997

Related U.S. Application Data

[63] Continuation of Ser. No. 405,911, Mar. 16, 1995, abandoned, which is a continuation of Ser. No. 261,244, Jun. 14, 1994, abandoned, which is a continuation of Ser. No. 938,529, Sep. 2, 1992, abandoned, which is a continuation of Ser. No. 593,541, Oct. 3, 1990, which is a division of Ser. No. 188,626, Apr. 29, 1988, abandoned, which is a continuation of Ser. No. 935,676, Nov. 7, 1986, abandoned.

[51] Int. Cl.$^6$ .................................................. C08F 16/06
[52] U.S. Cl. .............................. 525/56; 525/59; 525/60; 525/328.9; 526/330
[58] Field of Search .................... 525/56, 59, 60, 525/328.9; 526/330

[56] References Cited

U.S. PATENT DOCUMENTS

| | | | |
|---|---|---|---|
| 2,844,571 | 7/1958 | Broderick | 525/56 |
| 3,033,841 | 5/1962 | Germain | 525/56 |
| 3,218,281 | 11/1965 | Rees | 524/457 |
| 3,386,982 | 6/1968 | Gordon | 525/56 |
| 4,075,411 | 2/1978 | Dickstein | 542/46 |
| 4,618,648 | 10/1986 | Marten | 525/60 |
| 4,675,360 | 6/1987 | Marten | 525/60 |
| 5,070,140 | 12/1991 | Lind et al. | 526/330 |

FOREIGN PATENT DOCUMENTS

| | | |
|---|---|---|
| 0044995 | 2/1982 | European Pat. Off. . |
| 54-46284 | 4/1979 | Japan . |

*Primary Examiner*—Peter D. Mulcahy
*Attorney, Agent, or Firm*—Armstrong, Westerman, Hattori, McLeland & Naughton

[57] ABSTRACT

A dispersing stabilizer including (A) a polyvinyl alcohol resin containing oxyalkylene groups and having a surface tension of 35 to 55 dyne/cm at 20° C. as a 1% by weight aqueous solution, or said resin and (B) a water-soluble polymer or a polyvinyl alcohol resin having a low degree of hydrolysis and a low degree of polymerization. When using the dispersing stabilizer of the present invention, both of a porosity and a bulk density of a polyvinyl resin particle can be improved at the same time, and, in addition, a distribution of particle size and a uniformity of porosity can be further improved.

2 Claims, No Drawings

DISPERSING STABILIZER

This application is a continuation of application Ser. No. 08/405,911 filed Mar. 16, 1995, now abandoned, which was a continuation of application Ser. No. 08/261,244 filed Jun. 14, 1994, now abandoned, which was a continuation of application Ser. No. 07/938,529 filed Sep. 2, 1992, now abandoned, which was a continuation of application Ser. No. 07/593,541 filed Oct. 3, 1990, which was a divisional of application Ser. No. 07/188,626 filed Apr. 29, 1988, now abandoned, which was a continuation of application Ser. No. 06/935,676 filed Nov. 7, 1986, now abandoned, which was a § 371 national phase of international application PCT/JP85/00114 filed Mar. 6, 1985.

TECHNICAL FIELD

The present invention relates to a dispersing stabilizer for suspension polymerization or emulsion polymerization of unsaturated monomers such as vinyl compounds, and particularly to a dispersing stabilizer for suspension polymerization of vinyl chloride.

BACKGROUND ART

When polyvinyl chloride resins are prepared industrially, there is widely employed a suspension polymerization process where vinyl chloride monomer is dispersed in an aqueous medium in the presence of a dispersing stabilizer for suspension polymerization, and the polymerization is carried out with an oil-soluble catalyst. In general, qualities of products depend on a polymerization rate, a ratio of water-monomer, a polymerization temperature, an amount of catalyst, or a kind or amount of dispersing stabilizer. Among them, it is said that influence of the dispersing stabilizer is largest.

As properties required to dispersing stabilizers for suspension polymerization, there are (1) a property that stable aqueous dispersing can be obtained by using a small amount, and the particle size distribution of the obtained vinyl chloride polymer particles is narrowly defined; (2) a property that the obtained porous particles have a large porosity and bulk density for increasing a absorption speed of a plasticizer into the polymer particles to improve a molding processability; (3) a property that a porosity of each polymer particle can be converged into constant range for efficiently removing the remaining vinyl chloride monomer from the porous particles and for improving physical properties of molded article; and the like.

Vinyl chloride resins prepared by using such dispersing stabilizers can provide good molded articles having less fish eye.

Industrially, cellulose derivatives such as methylcellulose and carboxymethylcellulose, or partially hydrolyzed polyvinyl alcohols are practically used alone or in a mixture as conventional dispersing stabilizers. However, these stabilizers can not satisfy all of the above requirements.

DISCLOSURE OF THE INVENTION

As a result of our intensive study for developing a novel dispersing stabilizer which satisfies all of the above requirements, we have found a dispersing stabilizer which comprises (A) a polyvinyl alcohol resin containing oxyalkylene groups and having a surface tension of 35 to 55 dyne/cm at 20° C. as a 1% by weight aqueous solution, or said resin and (B) a water-soluble polymer or a polyvinyl alcohol resin having a low degree of hydrolysis and a low degree of polymerization.

BEST MODE FOR CARRYING OUT THE INVENTION

The oxyalkylene group used in the present invention is a group having a construction of the general formula:

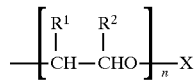

wherein $R^1$, $R^2$ are hydrogen atom or an alkyl group of 1 to 10 carbon atoms, X is hydrogen atom, an organic. residue such as an alkyl group of 1 to 30 carbon atoms, an alkyl ester group of 1 to 30 carbon atoms, an alkyl amide group of 1 to 30 carbon atoms or a sulfonate group, n is an integer of 1 to 300. Generally X is hydrogen, and n is preferably 2 to 300, most preferably about 3 to 300. In this case this oxyalkylene group is practical. Preferred examples are, for instance, polyoxyethylene group, polyoxypropylene group, polyoxybutylene group, and the like.

The polyvinyl alcohol resin containing oxyalkylene groups can be prepared by any process. For example, there is employed ① a process in which a vinyl ester is polymerized in the presence of a polyoxyethylene, and then hydrolyzed; ② a process in which an unsaturated monomer containing oxyalkylene groups is copolymerized with a vinyl ester, and then hydrolyzed; ③ a process in which an alkylene oxide is reacted with a polyvinyl alcohol; or the like. The process ② is practical in views of productivity of resins and properties of the produced resins.

In the following, the process 2 is concretely explained.

Examples of the unsaturated monomer containing oxyalkylene groups are the followings, provided that the present invention is not limited to those examples, and the monomer can be used alone or in a mixture of two or more.

(Meth)acrylate type

General formula:

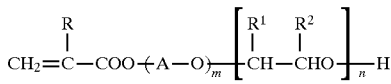

wherein R is hydrogen atom or methyl, A is an alkylene group of 1 to 10 carbon atoms, a substituted alkylene group of 1 to 10 carbon atoms, a phenylene group, a substituted phenylene group, m is 0 or an integer of 1 or more, n is an integer of 1 to 300, preferably 2 to 300, most preferably 3 to 300, $R_1$, $R_2$ are as defined above. Examples are polyoxyethylene (meth)acrylate, poly-oxy-propylene (meth)acrylate, poly(oxyethylene-oxypropylene) (meth)acrylate, and the like.

(Meth)acrylic acid amide type

General formula:

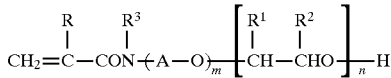

wherein $R^3$ is hydrogen atom, an alkyl group of 1 to 10 carbon atoms or

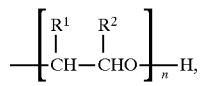

A, R, $R^1$, $R^2$, m, n are as defined above. Examples are polyoxyethylene (meth)-acrylic acid amide, polyoxypropylene (meth)acrylic acid amide, polyoxyethylene (1-(meth) acrylamide-1,1-dimethylpropyl) ester, poly (oxyethylene·oxypropylene) acrylic acid amide, and the like.
(Meth)allylalcohol type
General formula:

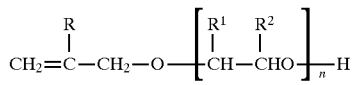

wherein R, $R^1$, $R^2$, n are as defined above. Examples are polyoxyethylene (meth)allyl ether, polyoxypropylene (meth)allyl ether, poly(oxyethylene·oxypropylene) (meth)allyl ether, and the like.
Vinyl ether type
General formula:

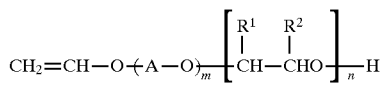

wherein A, $R^1$, $R^2$, m, n are as defined above. Examples are polyoxyethylene vinyl ether, polyoxypropylene vinyl ether, poly(oxyethylene·oxypropylene) vinyl ether, and the like.

Among those monomers, the (meth)allylalcohol type is suitably used.

As the vinyl ester, there are used vinyl formate, vinyl acetate, vinyl propionate, vinyl butyrate, vinyl caprate, vinyl laurate, vinyl versalate, a vinyl ester of branched fatty acid having an average carbon atom of 10 (VeoVa-10, designating name of Shell Chemical Co.), vinyl palmitate, vinyl stearate, and the like. They are used alone or in a mixture thereof. Among them vinyl acetate is particularly practical.

In the present invention, the polymerization may be carried out in the presence of a monomer other than the above-mentioned unsaturated monomer containing the oxyalkylene group and the vinyl ester. The amount of the monomer is not more than 50% by mole. Examples of the monomer are as follows:
Alkyl ester of ethylenically unsaturated carboxylic acid Examples are methyl crotonate, ethyl crotonate, methyl itaconate, ethyl itaconate, methyl sorbate, ethyl sorbate, a monoalkyl maleate, a dialkyl maleate, an alkyl oleate, methyl (meth)acrylate, ethyl (meth)acrylate, propyl (meth)acrylate, butyl (meth)acrylate, pentyl (meth)acrylate, heptyl (meth)acrylate, octyl (meth)acrylate, decyl (meth)acrylate, hexadecyl (meth)acrylate, octadecyl (meth)acrylate, and the like.
Allyl ester of saturated carboxylic acid Examples are allyl stearate, allyl laurate, allyl ester of fatty acid of coconut oil, allyl octylate, allyl butyrate, allyl acetate, and the like.
α-Olefin Examples are ethylene, propylene, α-hexene, α-octene, α-decene, α-dodecene, α-hexadecene, α-octadecene, and the like.
Ethylenically unsaturated carboxylic acid Examples are (meth)acrylic acid, crotonic acid, maleic acid (anhydride), fumaric acid, itaconic acid, an alkali metal salt thereof, an ammonium salt thereof, and the like.
Alkyl vinyl ether Examples are methyl vinyl ether, methyl vinyl ether, propyl vinyl ether, butyl vinyl ether, hexyl vinyl ether, octyl vinyl ether, decyl vinyl ether, dodecyl vinyl ether, tetradecyl vinyl ether, hexadecyl vinyl ether, octadecyl vinyl ether, and the like.
Alkyl allyl ether Examples are methyl allyl ether, ethyl allyl ether, propyl allyl ether, butyl allyl ether, hexyl allyl ether, octyl allyl ether, decyl allyl ether, dodecyl allyl ether, tetradecyl allyl ether, hexadecyl allyl ether, octadecyl allyl ether, and the like.

In addition to the above, there can be used (meth) acrylamide, (meth)acrylonitrile, (meth)allyl sulfonate, and ethylenically unsaturated sulfonic acid, styrene, vinyl chloride, allyl alcohol, and ethylenically unsaturated monomer having tertiary amine or quaternary ammonium salt, and the like.

The hydrolysis can be carried out by dissolving the copolymer in an alcohol and in the presence of an alkali catalyst or an acid catalyst.

To the molecule of the thus obtained polyvinyl alcohol resin, if necessary, carbonyl groups can be introduced by heat treatment or the like. Namely there is advantageously employed a resin which contains carbonyl group of not less than 0.03% by mole, and further contains two of vinylene groups and three of vinylene groups adjacent to the carbonyl group, and absorbance at 280 mμ and 320 mμ measured by ultraviolet spectroscopic method as a 0.2% by weight aqueous solution are respectively at least 0.20 and 0.05, and a ratio of an absorbance of 320 mμ to that of 280 mμ is 0.30 to 1.00.

In the thus obtained polyvinyl alcohol resin containing the oxyalkylene groups of the present invention, a content of the group is not particularly limited, and generally is 1 to 80% by weight, more preferably 2 to 60% by weight, most preferably 3 to 40% by weight to the resin. When the content of the group is less than 1% by weight the effects of the present invention cannot be obtained, and on the other hand when more than 80% by weight there is a problem that only vinyl chloride resins containing coarse particles are obtained.

As mentioned above, the dispersing stabilizer of the present invention must have a surface tension of 35 to 55 dyne/cm, desirably 40 to 55 dyne/cm at 20° C. as a 1% by weight aqueous solution. When the surface tension is less than 35 dyne/cm a distribution of particle size of the vinyl chloride resin becomes broad, and when more than 55 dyne/cm, the dispersing property becomes low to produce many coarse particles.

The surface tension as used in the present invention is measured by using Du Noüy tensiometer and using water as a comparative liquid, and is calculated according to the equation:

$$\gamma = \gamma_W \cdot \frac{\alpha}{\alpha_W}$$

wherein $\alpha_w$, $\alpha$ are readings of the tensiometer when measuring water and a 1% by weight aqueous solution of the dispersing stabilizer respectively, $\gamma_w$, $\gamma$ are surface tensions of each.

The degree of hydrolysis of the polyvinyl alcohol resin is 50 to 100% by mole, preferably 50 to 90% by mole, most preferably 70 to 90% by mole. When the degree of hydrolysis is less than 50% by mole, stability of polymerization becomes bad. In addition a viscosity (20° C.) of a 4% by weight aqueous solution of the resin is 1 to 70 cP, preferably 2 to 60 cP, most preferably 3 to 50 cP. When the viscosity is less than 1% by weight, stability of polymerization becomes low, and when more than 70 cP, molding processability of the obtained vinyl chloride resin becomes bad.

By using the polyvinyl alcohol resin alone, the effects of the present invention, i.e. the effects ① and ② can sufficiently be accomplished, and the effect ③ can almost be accomplished. Namely the dispersing stabilizer of the component (A) can improve the porosity and bulk density of the vinyl chloride resin particle at the same time. This property cannot be even obtained according to the conventional dispersing stabilizer.

According to the present invention all of the effects ①, ② and ③ can be exhibited remarkably by using both of the polyvinyl alcohol resin and the water-soluble polymer, and thus practical polyvinyl chloride resin molding articles can be produced.

In the present invention, when additionally using the water-soluble polymer (B), a preferred polymer is a polyvinyl alcohol having an average degree of hydrolysis of 60 to 100% by mole and an average polymerization degree of 100 to 3000, and a derivative thereof. Particularly, a polyvinyl alcohol having an average degree of hydrolysis of 65 to 95% by mole and an average polymerization degree of 300 to 3000 is effective. The derivative of the polyvinyl alcohol is a polyvinyl alcohol containing a carbonyl group, e.g. a polyvinyl alcohol containing two of vinylene groups and three of vinylene groups adjacent to the carbonyl group, and absorbance at 280 m$\mu$ and 320 m$\mu$ measured by ultraviolet spectroscopic method as a 0.2% by weight aqueous solution are respectively at least 0.20 and 0.05, and a ratio of an absorbance of 320 m$\mu$ to that of 280 m$\mu$ is 0.30 to 1.00; a formalized, acetalized, butyralized or urethanated polyvinyl alcohol; an ester with a sulfonic acid or a carboxylic acid; or the like. In addition a hydrolyzed copolymer of a vinyl ester with a monomer which is copolymerizable with the vinyl ester. Examples of the monomer are olefins such as ethylene, propylene, isobutylene, $\alpha$-octene, $\alpha$-dodecene and $\alpha$-octadecene; unsaturated acids such as acrylic acid, methacrylic acid, crotonic acid, maleic acid, maleic acid anhydride, itaconic acid, or salts thereof, mono- or di-alkyl esters; nitriles such as acrylonitrile and methacrylonitrile; amides such as acrylamide and methacrylamide; monomers containing a sulfonic acid or a salt thereof such as ethylenesulfonic acid, allylsulfonic acid or methallylsulfonic acid; alkyl vinyl ethers; vinyl ketones; N-vinylpyrrolidone, vinyl chloride; vinylidene chloride; and the like. However, the monomer is not limited to the above examples.

Examples of the water-soluble polymer other than polyvinyl alcohol are cellulose derivatives such as methylcellulose, ethylcellulose, hydroxymethylcellulose, hydroxybutylmethylcellulose, hydroxyethylcellulose, carboxymethylcellulose, aminomethylhydroxypropylcellulose and aminoethylhydroxypropylcellulose; starch; tragacanth; pectin; glue; arginic acid and salts thereof; gelatine; polyvinylpyrrolidone; polyacrylic acid and salts thereof; polymethacrylic acid and salts thereof; polyacrylamide; polymethacrylamide; copolymers of vinyl acetate with an unsaturated acid such as maleic acid, maleic acid anhydride, acrylic acid, methacrylic acid, itaconic acid, fumaric acid or crotonic acid; copolymers of styrene with the above unsaturated acid; copolymers of vinyl ether with the above unsaturated acid; salts or esters of the copolymers; and the like.

Further, the similar effects can be expected when using a polyvinyl alcohol resin having low degree of hydrolysis and low polymerization degree, i.e. a polyvinyl alcohol resin having an average hydrolysis of 20 to 55% by mole and an average polymerization degree of 100 to 1000, as the component (B) other than the above-mentioned water-soluble polymer.

In addition, the polyvinyl alcohol resin containing the oxyalkylene groups and having the low hydrolysis degree and low polymerization degree in the present invention is also useful.

When carrying out the suspension polymerization by using the dispersing stabilizer, the dispersing stabilizer is used in an amount of 0.005 to 3% to the weight of vinyl chloride monomer. In case that the component (A) and the component (B) are used together, a polymerization ratio of (A) to (B) is preferably 5/90 to 90/10, more effectively 10/90 to 70/30.

Generally the suspension polymerization is carried out in the presence of an oil-soluble catalyst by adding the dispersing stabilizer to aqueous medium, dispersing a vinyl monomer. The dispersing stabilizer is added to aqueous medium in a form of powder or solution. When adding in a form of solution, the solution is prepared by dissolving the stabilizer in water or a mixture of water and an organic solvent such as an alcohol, a ketone or an ester.

The dispersing stabilizer may be added at one time at an initial stage, or the stabilizer may be added dividedly during the polymerization.

As the catalyst, oil-soluble catalyst can be used. Examples are, for instance, benzoyl peroxide, lauroyl peroxide, diisopropyl peroxide, $\alpha,\alpha'$-azobisiso-butyronitrile, $\alpha,\alpha$-azobis-2, 4-dimethylvaleronitrile, acetylcyclohexylsulfonyl peroxide, and the like. These catalysts may be used alone or in a mixture.

The polymerization temperature is selected from a range from about 30° to 70° C.

If desired, it is possible to additionally use various surfactants or inorganic dispersing agents in the polymerization.

Further, in addition to the homo-polymerization of vinyl chloride, copolymerization of vinyl chloride with a monomer which is copolymerizable therewith can be carried out. Examples of the copolymerizable monomer are vinylidene halide, vinyl ether, vinyl acetate, vinyl benzoate, acrylic acid, methacrylic acid, esters thereof, maleic acid and its acid anhydride, ethylene, propylene, styrene, and the like.

In the above, the polymerization of vinyl chloride is mainly explained. However, the dispersing stabilizer of the present invention is not necessarily limited to the polymerization of vinyl chloride, and can be used for suspension polymerization of any vinyl compound such as styrene, methacrylate or vinyl acetate.

The dispersing stabilizer of the present invention can be used in order to produce an emulsion by emulsion polymerization or post-emulsification. Those emulsion has a remarkably improved storage stability, a freeze-thaw stability, and the like.

When using as an emulsifier, a desired average hydrolysis degree of the stabilizer of the present invention is 70 to 100% by mole, most preferably 80 to 100% by mole. On the other hand, a viscosity as a 4% by weight aqueous solution is 2 to 60 cP, preferably 3 to 50 cP.

When carrying out the emulsion polymerization there can be employed any conventional emulsion polymerization, e.g. an emulsion polymerization carried out by adding at one time or continuously the unsaturated monomer to aqueous medium containing the dispersing stabilizer and the polymerization catalyst, and then heating with stirring. An amount of the dispersing stabilizer to be used varies a little with a kind and a resin content required to the emulsion, and is generally selected from a range of about 1 to 8% by weight to the whole of the emulsion polymerization reaction system. As the polymerization catalyst, potassium peresulfate, ammonium persulfate or the like is used alone on together with acidic sodium sulfite. Also there can be used redox type catalysts such as hydrogen peroxide-tartric acid, hydrogen peroxide-iron salt, hydrogen peroxide-ascorbic acid-iron salt, hydrogen peroxide-Rongalite and hydrogen peroxide-Rongalite-iron salt. Of course, the dispersing stabilizer can be used not only alone but also together with various water-soluble polymers as mentioned above. Further, there can be additionally used nonionic surfactants such as polyoxyethylene-alkyl ether type, polyoxyethylene-alkylphenol type, polyoxyethylene-polyhydric alcohol ester type, polyhydric alcohol with fatty acid ester and oxyethylene-oxypropylene block-polymer; anionic surfactants such as higher alcohol sulfate, alkali salt of higher fatty acid, polyoxyethylene alkyl phenol ether sulfate, alkylbenzene sulfonate, formalin condensate of naphthalene sulfonate, alkyldiphenyl ether sulfonate, dialkyl sulfosuccinate and higher alcohol phosphate salt. When using the dispersing stabilizer together with the surfactant, a mixing ratio, i.e. the dispersing stabilizer/the surfactant is suitably 20/1 to 1/20 (weight ratio). It is not necessary to use them as mixture, and it is possible to employ any manner, e.g. using one component at the initial stage of polymerization, and then the other component is added during the polymerization. Moreover there can be used a plasticizer such as a phthalate or a phosphate, a pH controlling agent such as sodium carbonate, sodium acetate or sodium phosphate.

The unsaturated monomer to be emulsion-polymerized is an ethylenically unsaturated monomer, butadiene type monomer, or the like.

Examples of the ethylenically unsaturated monomer are vinyl acetate, acrylate, methacrylate, vinyl chloride, vinylidene chloride, acrylonitrile, styrene, ethylene, and the like. These monomers are homo-polymerized or co-polymerized. Particularly when homo- or co-polymerizing the acrylic monomer such as acrylate or methacrylate, the obtained emulsion is good in mechanical stability, storage stability and miscibility with pigment. Therefore the emulsion polymerization of the acrylic monomer is suitably carried out.

Examples of the butadiene type monomer are butadiene-1,3; 2-methylbutadiene-1,3; 2,3-dimethylbutadiene-1,3; 2-chlorobutadiene-1,3; and the like. These monomers may be used alone or together with the ethylenically unsaturated monomer. Among them it is advantageous to carry out the polymerization in the combination of butadiene-1,3 and styrene, butadiene-1,3 and styrene and (meth)acrylic acid, butadiene-1,3 and acrylonitrile, butadiene-1,3 and acrylonitrile and styrene, butadiene-1,3 and acrylonitrile and (meth)acrylate, butadiene-1,3 and methyl methacrylate, butadiene-1,3 and methyl methacrylate and (meth)acrylic acid.

Further, according to the present invention, it is possible to remarkably improve the storage stability, freeze-thaw stability and dilution stability by adding the above dispersing stabilizer to an aqueous emulsion prepared by emulsion-polymerizing the unsaturated monomer in an aqueous medium with various nonionic or anionic surfactants alone or in a mixture thereof, or with various water-soluble protective colloid.

When an emulsion is prepared by post-emulsification process with the dispersing stabilizer of the present invention, the dispersing stabilizer is dissolved in water, and then the water-soluble resin is added dropwise to the solution the resin in a form of solution or a molten state with stirring, or the aqueous solution of the dispersing stabilizer is added dropwise to a molten water-soluble resin with stirring. During the emulsification, it is not necessary to heat. However, if necessary, the system may be heated to about 45° to 85° C.

The resin to be emulsified is not particularly limited, and examples thereof are epoxy resins, urethane resins, urea-formalin initial condensate, phenol-formaldehyde initial condensates, alkyd resins, alkylketene dimers, rosin, silicone resins, waxes, polypropylene, polyethylene, asphalts, and the like. If necessary, there can be additionally used every surfactant employed in the emulsion polymerization as well as a nonionic surfactant such as polyoxyethylene-alkyl ether type, polyoxyethylene-alkyl phenol type or polyhydric alcohol ester type, and a cationic surfactant such as higher alkylamine salt. Also these surfactants can be previously mixed with the resin to be emulsified. In addition, there can be additionally used a plasticizer such as a phthalate or a phosphate, a pH controlling agent such as sodium carbonate, sodium acetate or sodium phosphate.

To the thus obtained emulsion a water-soluble polymer can be added for thickening. Generally the amount to be added is suitably 5 to 500% by weight as a solid content to the emulsion. Examples of the water-soluble polymer are polyvinyl alcohol, starch, CMC, hydroxymethylcellulose, methylcellulose, casein, and the like. These can be mixed in any form such as aqueous solution or powder.

If necessary, to the emulsion there may be optionally added crosslinking agents, water proofing agents, pigments, dispersing agents, defoaming agents, detergents, and the like.

The produced emulsions are useful as raw materials for paper coating agents, adhesives, paints, fiber treating agents, cosmetics, constructions and buildings, and the like.

In the following, the dispersing stabilizer of the present invention is more specificatically explained with Examples. In the following, "part" and "%" are by weight, otherwise noted.

Example 1

An stainless steel autoclave of 100 l with a stirrer was charged with 100 parts of vinyl chloride monomer, 150 parts of water, 0.1 part of the dispersing stabilizer and 0.2 part of lauroyl peroxide as a polymerization catalyst. The suspension polymerization was carried out at a temperature of 60° C. while stirring at a rotation number of 400 rpm.

The properties of the obtained vinyl chloride resins were evaluated according to the following methods. The results are shown in Table 2.
(Distribution of particle size)

The distribution is represented by showing a content (%) of coarse particles which did not pass through 42 mesh screen of JIS standard. In case that the percentage of the content of the 42 mesh on is less than 1%, such the product is indicated by A, and in case of 1 to 5% such the product is indicated by B, and in case of more than 5% such the product is indicated by C.
(Absorption of plasticizer)

A dry up time of a mixture of 6 parts of vinyl chloride polymer and 4 parts of DOP was measured with a Brabender. In case of less than 3 minutes, such the product is indicated by A, in case of 3 minutes to less than 5 minutes the indication is B, in case of 5 to 10 minutes the indication is C.
(Porosity)

Measured by a mercury porosity meter.
(Bulk density)

Measured according to JIS K 6721.

(Fish eye)

A mixture of 100 parts of the vinyl chloride resin and 50 parts of DOP was kneaded with rolls to produce a sheet of 300 μm in thickness, and the number of fish eyes per 100 cm² was counted.

(Uniformity of porosity)

The vinyl chloride resin particles were made absorb a mineral oil. The particles were put on a slide glass and a light source was set under the slide glass. The number of opaque particles which the light did not pass through was counted per 100 particles by a microscope. (In case of particles having a large porosity, a light can pass through because of their transparency.) The product having 0 or 1 opaque particle is indicated by A, the product having 2 or 3 opaque particles is indicated by B, and the product having 4 to 6 is indicated by C.

Examples 2 to 7 and Comparative Example

The same experiments were repeated expect that the dispersing stabilizers as shown in Table 1 were employed. The results are shown in Table 2.

TABLE 1

| | Dispersing Stabilizer (A) Polyvinyl alcohol resin containing oxyalkylene groups | | | | | |
|---|---|---|---|---|---|---|
| | Unsaturated monomer containing oxyalkylene groups | | degree of hydrolysis (% by mole) | Surface tension of 1% aqueous solution (dyne/cm) | Viscosity of 4% aqueous solution (cP) | Used amount (part) |
| Ex. No. | Kind | Content (%) | | | | |
| 1 | Polyoxyethylene monoallyl ether (n = 15) | 20 | 80 | 50 | 7.5 | 0.10 |
| 2 | Polyoxyethylene monoallyl ether (n = 15) | 20 | 65 | 48 | 6.1 | 0.05 |
| 3 | Polyoxypropylene monoallyl ether (n = 15) | 14 | 80 | 42 | 8.6 | 0.10 |
| 4 | Mixture of polyoxyethylene monoallyl ether (n = 15) and polyoxypropylene monoallyl ether (n = 15) (1:1 by weight) | 40 | 70 | 47 | 21.3 | 0.10 |
| 5 | Polyoxyethylene acrylic acid amid (n = 30) | 10 | 80 | 50 | 35.0 | 0.10 |
| 6 | Polyoxyethylene vinyl ether (n = 50) | 10 | 88 | 55 | 16.6 | 0.05 |
| 7 | Polyoxypropylene monoallyl ether (n = 20) | 20 | 73 | 40 | 9.8 | 0.10 |
| Comp. Ex. | — | — | — | — | — | — |

| | Dispersing Stabilizer (B) Polyvinyl alcohol | | |
|---|---|---|---|
| Ex. No. | degree of hydrolysis (% by mole) | degree of Polymerization | Used Amount (part) |
| 1 | — | — | — |
| 2 | 80 | 2000 | 0.05 |
| 3 | — | — | — |
| 5 | — | — | — |
| 6 | 73 | 600 | 0.05 |
| 7 | 112 | 300 | 0.04 |
| Comp. Ex. | 80 | 2000 | 0.10 |

TABLE 2

| | Properties of vinyl chloride resin | | | | | |
|---|---|---|---|---|---|---|
| Ex. No. | Porosity (% by mole) | Bulk density | Distribution of particle size (part) | Uniformity of porosity | Fish eye (number/100cm²) | Absorption of plasticizer |
| 1 | 0.35 | 0.57 | A to B | A to B | 10 | A |
| 2 | 0.36 | 0.57 | A | A | 8 | A |
| 3 | 0.38 | 0.55 | A to B | A | 4 | A |
| 4 | 0.38 | 0.57 | A | A | 3 | A |
| 5 | 0.34 | 0.56 | A | A | 15 | A to B |
| 6 | 0.35 | 0.57 | A | A | 9 | A to B |
| 7 | 0.38 | 0.56 | A | A | 0 | A |
| Comp. Ex. | 0.28 | 0.51 | C | C | 350 | C |

Examples 8 to 13

A polymerization glass vessel of 500 cc with a reflux cooler, a dropping funnel, a thermometer and an stirrer was charged with 150 parts of 4.0% aqueous solution of the dispersing stabilizer shown in Table 3 and 5 parts of 10% aqueous solution of sodium secondary phosphate as a pH controlling agent, and then the inside temperature was raised to 65° C. while stirring at 200 rpm. Consequently emulsion polymerization was started by adding 9 parts of butyl acrylate and 1.25 parts of 4% aqueous solution of potassium persulfate. Initial polymerization was carried out for 35 minutes, and thereafter 81 parts of butyl acrylate was continuously added dropwise for 4 hrs while regulating the inside temperature of the vessel at 70° C. The emulsion polymerization was continued by adding 5 parts of 4% aqueous solution of potassium persulfate which was divided twice. By maintaining the inside temperature at 75° C. aging reaction was carried out for 1 hr, and thereafter the remaining monomer was removed to give an emulsion of polybutyl acrylate.

Various properties of the emulsion were measured according to the following methods. The results are shown in Table 4.

In Table 4, there are also shown the results of Comparative Example which were obtained by repeating Example 1 except that a mixture of 2.7 g of a nonionic surfactant (Nissan Nonion P-230 available from Nippon Oil & Fats Co., Ltd.) and 0.8 g of an anion surfactant (Nissan Trax H-45 available from Nippon Oil & Fats Co., Ltd.) instead of the dispersing stabilizer.

(Storage stability)

About 50 g of the emulsion was continuously allowed to stand in a thermostat of 60° C. for 5 days, and thereafter the emulsion was naturally cooled for 3 hrs, and then agitated. From the observation of appearance, no changed emulsion is evaluated as A, and the destroyed emulsion is evaluated as E. The states between them are classified to three states as B, C and D.

(Freeze-thaw stability)

About 50 g of the emulsion was kept at −15° C. for 16 hrs, and then was allowed to stand in a thermostat of 30° C. for 1 hr. After the emulsion was agitated with a glass lod, the appearance was observed. No changed emulsion is evaluated as A, and the destroyed emulsion is evaluated as E. The states between them are classified to three states as B, C and D.

(Dilution stability)

The emulsion was diluted by adding distilled water so that the resin content was 3%. The diluted emulsion was pored into a glass tube of 7 mm in inner diameter and of 1 mm in length, and then sealed. After allowing to stand for 24 hrs, a depth of a supernatant (upper layer) and a depth of a precipitant (lower layer) were observed. The diluted stabilities are indicated by A, B, C, D and E in order of good stability.

TABLE 3

| | Dispersing Stabilizer (A) Polyvlnyl alcohol resin containing oxyalkylene groups | | | | | | |
|---|---|---|---|---|---|---|---|
| | Unsaturated monomer containing oxyalkylene groups | | degree of hydrolysis | Surface tension of 1% aqeuous solution | Viscosity of 1% aqueous solution | Surfactant | |
| Ex. No. | Kind | Content (%) | (% by mole) | (dyne/cm) | (cP) | Used amount (part) | Kind | Used amount (part) |
| 8 | Polyoxyethylene monoallylether (n = 15) | 20 | 88 | 50 | 5.5 | 5 | — | — |
| 9 | Polyoxypropylene monoallyl ether (n = 20) | 10 | 99 | 45 | 4.5 | 5 | — | — |
| 10 | Polyoxyethylene monoallyl ether (n = 30) | 40 | 70 | 48 | 25.3 | 5 | — | — |
| 11 | Poly(oxyethylene · oxypropylene) monoallyl ether (n = 30, oxyethylene/oxypropylene = 1/1 by weight) | 10 | 99 | 45 | 14.8 | 5 | — | — |
| 12 | Same as Example 8 | 20 | 88 | 50 | 5.5 | 2.5 | Nissan Nonion p-230 | 2.5 |
| 13 | Same as Example 9 | 10 | 99 | 45 | 4.5 | 2.5 | Nissan Nonion p-230 | 2.5 |
| Comp. Ex. | — | — | — | — | — | — | Nissan Nonion p-230 | 2.7 |
| | | | | | | | Nissan Trax H 45 | 0.8 |

TABLE 4

| Ex. No. | Properties of emulsion | | |
|---|---|---|---|
| | Storage stability | Freeze-thaw satility | Dilution stability |
| 8 | A to B | A to B | A to B |
| 9 | A to B | A to B | A to B |
| 10 | A to B | A to B | A to B |

TABLE 4-continued

| Ex. | Properties of emulsion | | |
|---|---|---|---|
| No. | Storage stability | Freeze-thaw satility | Dilution stability |
| 11 | A to B | A to B | A to B |
| 12 | A | A | A |
| 13 | A | A | A |
| Comp. Ex. | E | E | E |

We claim:

1. A process for preparing a water-soluble copolymer having a dispersion stabilizing property, which comprises copolymerizing vinyl acetate and at least one unsaturated monomer containing 2 to 300 oxyalkylene groups to obtain a random copolymer and hydrolyzing the copolymer, wherein the content of oxyalkylene groups in the copolymer is 3 to 40% by weight based on the whole copolymer, and wherein the unsaturated monomer is at least one monomer selected from the group consisting of a monomer represented by the formula (I):

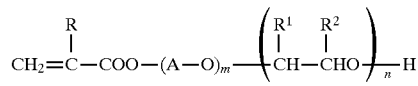

(I)

wherein R is hydrogen or methyl, A is an alkylene group of 1 to 10 carbon atoms, a substituted alkylene group of 1 to 10 carbon atoms, $R^1$ and $R^2$ are hydrogen or an alkyl group of 1 to 10 carbon atoms, m is 0 or an integer of 1 or more and n is an integer of 1 to 300;

a monomer represented by the formula (II):

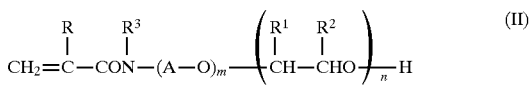

(II)

wherein $R^3$ is hydrogen, an alkyl group of 1 to 10 carbon atoms, or

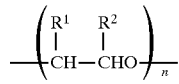

H, and A, R, $R^1$, $R^2$, m, and n are as defined above;

a monomer represented by the formula (III):

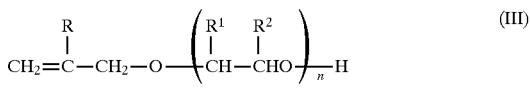

(III)

wherein R, $R^1$, $R^2$, and n are as defined above; and a monomer represented by the formula (IV):

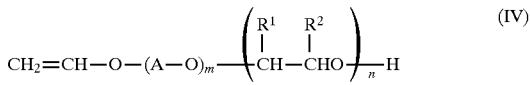

(IV)

wherein A, $R^1$, $R^2$, m, and n are as defined above.

2. The process of claim 1, further comprising introducing one or more carbonyl groups to the hydrolyzed copolymer by heat treatment.

* * * * *